United States Patent [19]

Day

[11] Patent Number: 4,659,132
[45] Date of Patent: Apr. 21, 1987

[54] CONVERTIBLE BEVERAGE BODY FOR DELIVERY TRUCK OR TRAILER

[75] Inventor: Gerald G. Day, Marietta, Ga.

[73] Assignee: The Coca-Cola Company, Atlanta, Ga.

[21] Appl. No.: 829,724

[22] Filed: Feb. 14, 1986

[51] Int. Cl.$^4$ .......................... B60P 3/42; B60P 3/24
[52] U.S. Cl. .................. 296/24 R; 296/24 B; 296/181; 105/371
[58] Field of Search ............... 296/3, 10, 24 R, 24 B, 296/181, 182, 183, 25, 1 F, 14; 105/370, 371, 372; 108/108; 312/259, 262, 313; 62/239; 410/131, 140

[56] References Cited

U.S. PATENT DOCUMENTS

| | | | |
|---|---|---|---|
| Re. 27,615 | 4/1973 | Brown, Jr. et al. ................. | 105/369 |
| 2,160,870 | 6/1939 | Jones .................... | 105/376 |
| 2,495,418 | 1/1950 | Nielsen ................... | 280/106 |
| 2,541,274 | 2/1951 | Nixon ........................ | 296/28 |
| 2,678,139 | 5/1954 | Gildersleeve ............ | 214/83.24 |
| 2,724,611 | 11/1955 | Robertson ............... | 296/3 X |
| 2,820,667 | 1/1958 | Benaroya et al. ................. | 410/140 |
| 3,057,489 | 10/1962 | Gilliam, Jr. ..................... | 296/183 X |
| 3,073,261 | 1/1963 | Oglesby ........................ | 410/131 |
| 3,131,648 | 5/1964 | Seger ............................ | 105/369 |
| 3,177,816 | 4/1965 | Daberkow ..................... | 105/369 |
| 3,181,311 | 5/1965 | Latzer ............................ | 62/440 |
| 3,212,458 | 10/1965 | Robertson ..................... | 105/369 |
| 3,324,595 | 6/1967 | Loomis .......................... | 49/177 |
| 3,399,794 | 9/1968 | Hummel ........................ | 296/183 |
| 3,572,815 | 3/1971 | Hackney ........................ | 296/40 |
| 3,718,099 | 2/1973 | Thornton ....................... | 105/369 |
| 3,752,529 | 8/1973 | Remke et al. ................... | 296/24 R |
| 3,754,516 | 8/1973 | Van Gompel .................. | 105/369 B |
| 3,786,947 | 1/1974 | Craft, III ....................... | 296/24 R X |
| 3,856,344 | 12/1974 | Loeber ............................ | 296/28 M |
| 3,872,799 | 3/1975 | Dousset .......................... | 105/492 |
| 3,897,971 | 8/1975 | Evans ............................. | 296/24 R |
| 4,087,125 | 5/1978 | Stephens ........................ | 296/24 B |
| 4,127,300 | 11/1978 | Melley et al. .................. | 296/28 R |
| 4,281,870 | 8/1981 | Ehrlich et al. ................. | 105/372 X |
| 4,303,271 | 12/1981 | Law ................................ | 296/10 |
| 4,332,204 | 6/1982 | Hewell ........................... | 108/108 X |
| 4,459,821 | 7/1984 | Cabell et al. ................... | 62/239 |
| 4,498,824 | 2/1985 | Kinkle ............................ | 410/121 |
| 4,505,126 | 3/1985 | Jones .............................. | 62/239 |
| 4,527,826 | 7/1985 | O'Neal ........................... | 296/3 |
| 4,534,589 | 8/1985 | Booher .......................... | 296/182 |

FOREIGN PATENT DOCUMENTS 1370079 7/1963 France .

OTHER PUBLICATIONS

Equipco Unitized Shipping Handbook, Oct. 28, 1963.

Primary Examiner—David A. Scherbel
Assistant Examiner—Russell D. Stormer
Attorney, Agent, or Firm—Thomas R. Boston

[57] ABSTRACT

A beverage body for a delivery truck or trailer that is convertible between being arranged for use in side loading at ground level or rear loading at dock height. The body includes: (a) hinged bulkheads separating the side loading bays that swing out against the roll-up doors on the vehicle sidewalls to provide a completely open interior for rear loading, (b) hinged bay back panels that form the backs of the bays during side loading and that swing down to form a flat upper floor at the floor level of the wheel housing bay for receiving carts and pallets, (c) a longitudinal support beam located entirely below the wheel housing bay floor, and (d) a rear door.

14 Claims, 8 Drawing Figures

CONVERTIBLE BEVERAGE BODY FOR DELIVERY TRUCK OR TRAILER

BACKGROUND OF THE INVENTION

1. Field of the Invention

This invention relates to delivery trucks or trailers used to deliver containers of soft drinks to sales outlets, and in particular to a vehicle beverage body that is convertible back and forth between side-loading at ground level and rear loading at dock height.

2. Description of the Prior Art

At present, bottlers who operate a bulk delivery system for large accounts, use a tractor trailer unit and deliver to a loading dock. The trailer has rear doors that open into a large, completely open, interior area with a flat floor.

The typical chain store wants such bulk rigs in and out of their loading docks within a very narrow time span each morning. To meet this requirement requires a large number of such bulk rigs that are left idle the rest of the day. The number of such bulk rigs that are needed can be reduced by attempting to negotiate appropriate delivery times with the chain stores, however, this is very time consuming and has not been a satisfactory solution to the problem.

Bottlers also use side-loading route trucks for conventional deliveries to sales outlets that receive merchandise through a door at ground level. Such trucks have a plurality of bays or compartments along each sidewall with floors that slope down into the truck and with sliding doors that roll up to provide entry into each bay. An A-frame extends longitudinally down the middle of the length of the truck to provide a back to each bay and to provide the main source of strength and rigidity for the trailer.

It is an object of the present invention to overcome the above-mentioned problems in the prior art.

It is another object of the present invention to provide a beverage body that is convertible for use as either a bulk delivery rig with rear loading at dock height, or as a conventional side-loading route truck or trailer.

It is a still further object of this invention to provide a convertible beverage body in which the main support beam is completely below the wheel bay floor so that the body can be converted to provide an interior that is completely open and free of obstruction.

It is another object of this invention to provide a method for converting a beverage body for a delivery vehicle from side loading with separate bays, a sloping floor and interior partitions, to rear loading with a completely open interior with a flat floor.

SUMMARY OF THE INVENTION

A beverage body for a delivery truck or trailer that can be used for conventional route deliveries to sales outlets that receive merchandise through a door at ground level, using roll-up side doors that open into separate bays, and that includes hinged interior bay partitions that swing out of the way to provide a completely open interior with a flat floor at dock height for bulk deliveries to outlets which have an elevated receiving dock. When operated in the rear unload mode, pallet loads moved by pallet jack, or carts on casters are used to move the soft drinks into the store. In this mode, the bottom of the bays is still available for conventional ground level unloading.

The beverage body of this invention includes a longitudinal support beam that runs down the center of the body, but that is located completely below the level of the wheel bay floor to provide a completely open interior that will accept three rows of carts or two rows of pallets, through the rear door.

BRIEF DESCRIPTION OF THE DRAWINGS

The present invention will be more fully understood from the detailed description below when read in connection with the accompanying drawings wherein like reference numerals refer to like elements and wherein.

DETAILED DESCRIPTION OF THE PREFERRED EMBODIMENT

Figure 1:
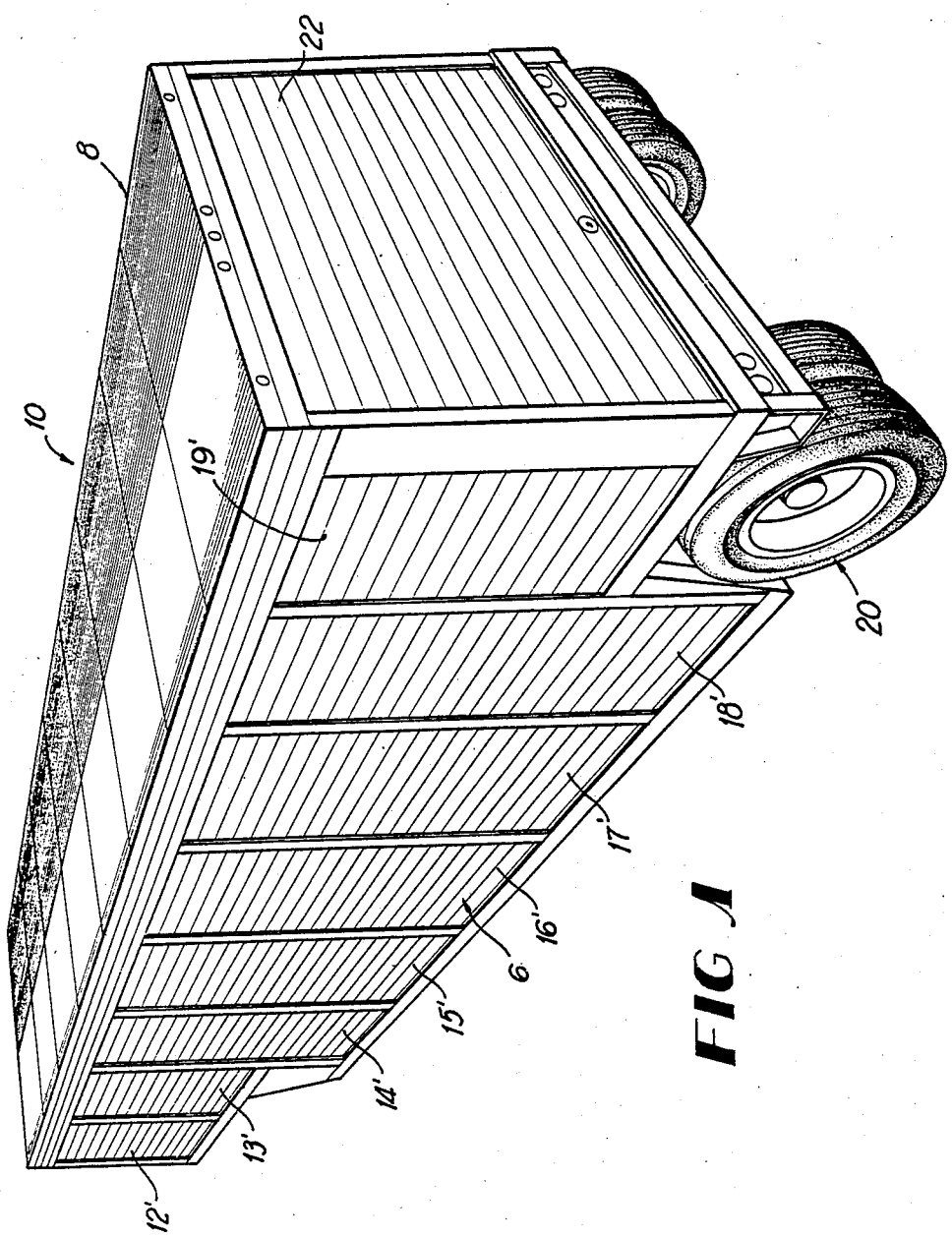
FIG. 1 is a rear perspective view of a convertible trailer according to the present invention, shown with all of its doors in their "down" position.

With reference now to the drawings, FIGS. 1–8 show a preferred arrangement of the convertible beverage body 10 for a delivery truck or trailer, according to the present invention. Although the preferred embodiment is a trailer, it is noted that a truck body can also be used. Also, while a preferred number of bays is shown and a preferred number of those are shown to be convertible, any other number can be used.

The body 10 includes a pair of parallel sidewalls 6 and 8, and a plurality of bays 12L–19L on the left side and 12R–19R on the right side. The bays 19 are wheel housing bays above a standard wheel-axle unit 20. The bays 12 and 13 are located above the fifth wheel, and bays 12–14 are permanent and are not convertible. Access to the bays is provided by standard roll-up sliding doors 12'–19'. A roll-up sliding rear door 22 provides access into the interior of the body during rear loading. Other types of doors can be used, if desired, in place of sliding doors 12'–19' and 22.

Figure 2:
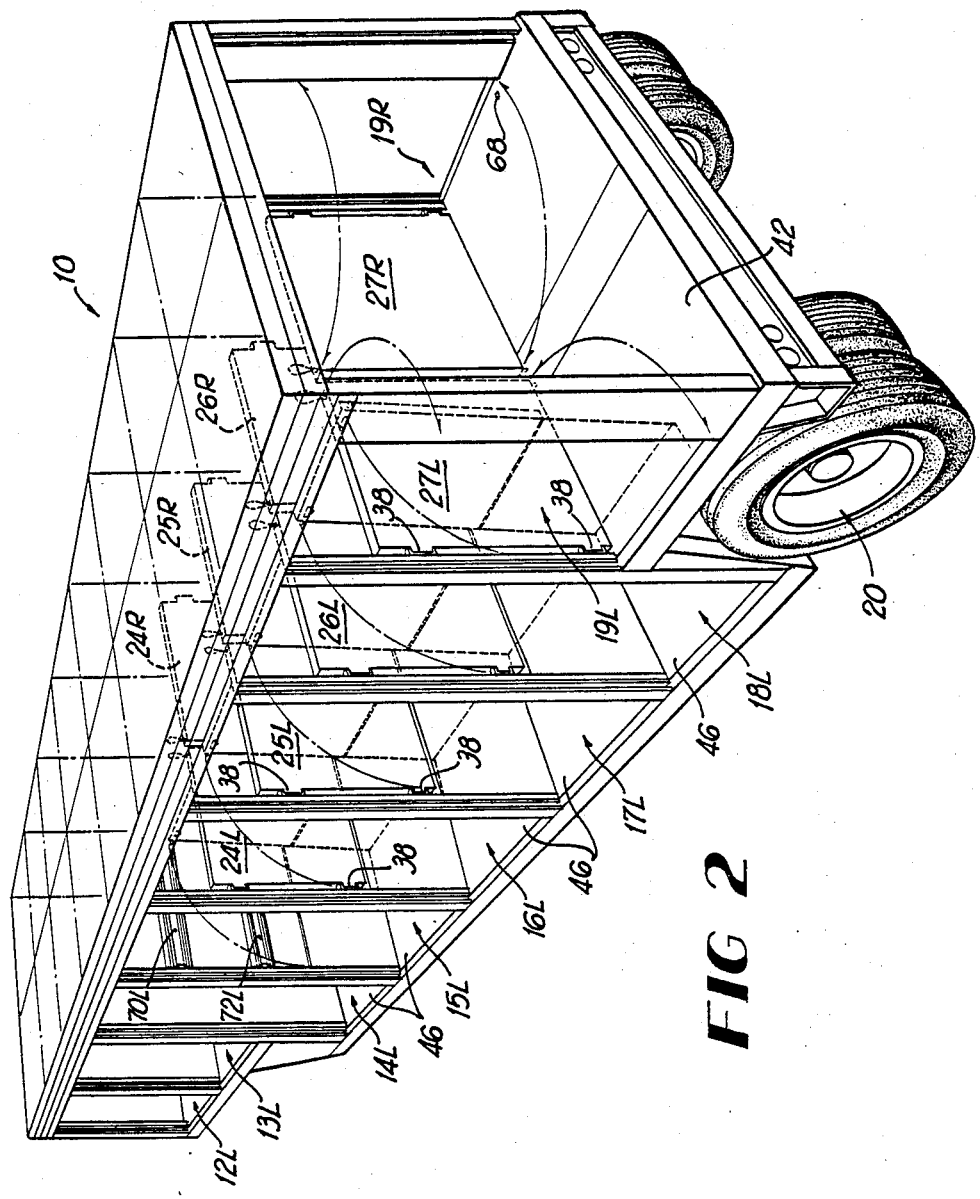
FIG. 2 is a rear perspective view as in FIG. 1 with the body arranged for side loading and with all of the doors in their "up" position.
Figure 3:
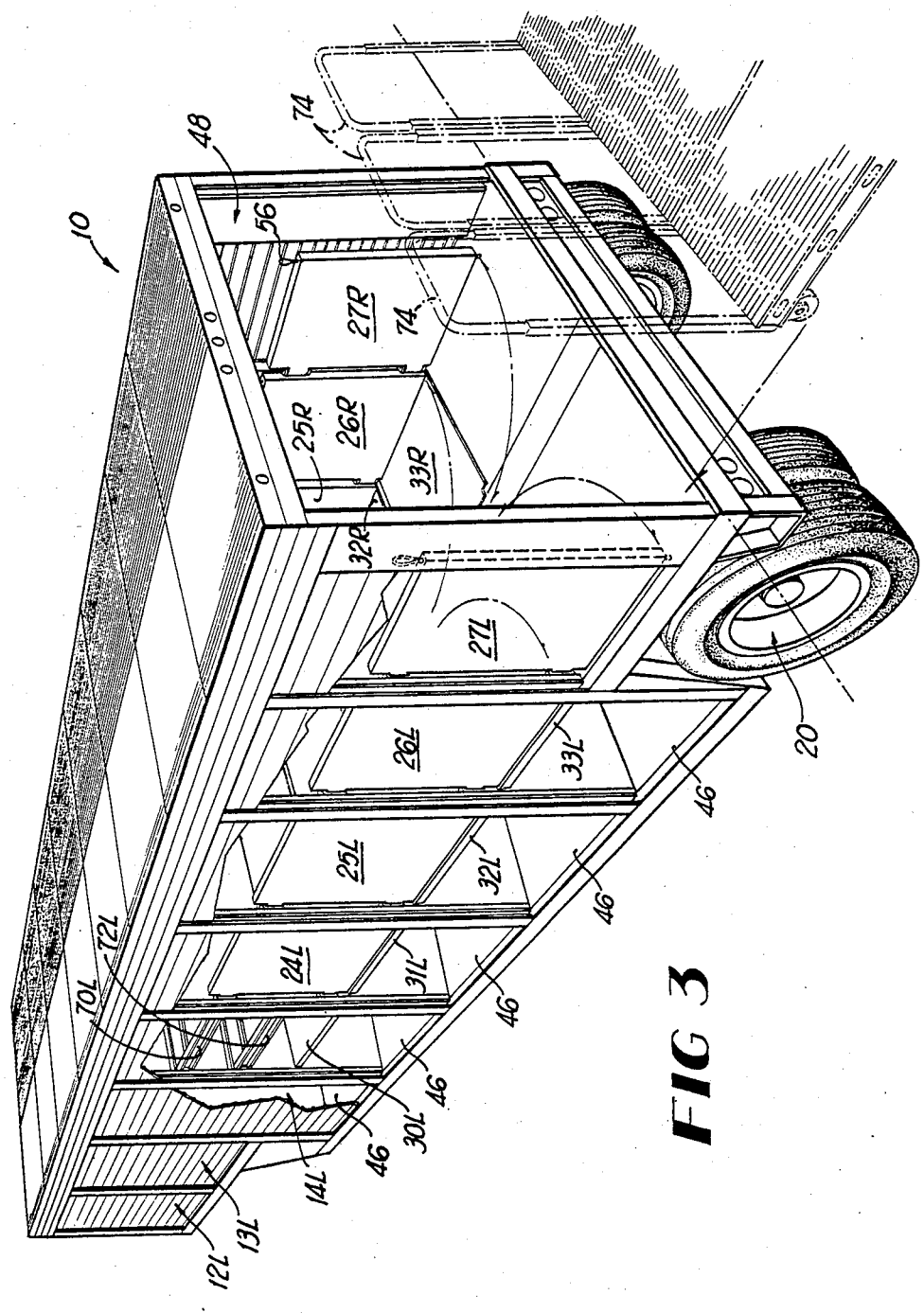
FIG. 3 is a rear perspective view similar to FIG. 2 but with the body arranged for dock loading and with all of the doors in their "up" position to reveal the internal structure.
Figure 4:
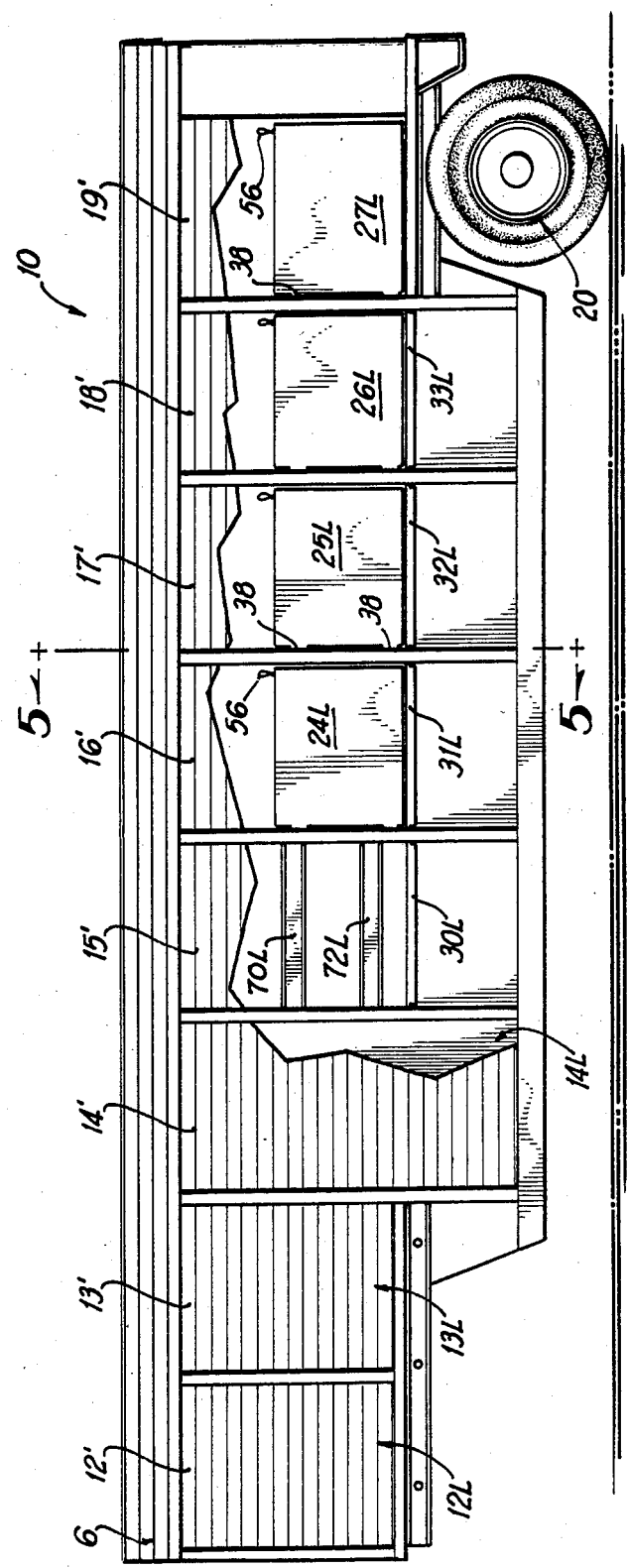
FIG. 4 is a side elevational view of the body of FIG. 1.

FIG. 1 shows the body 10 with all of the doors down. FIG. 2 shows the body 10 with the sliding side doors 12'–19' up and the body 10 arranged for side loading, while FIG. 3 shows the body 10 converted for rear loading. In FIG. 3 the sliding side doors 12'–19' are shown in their "up" position just to better show the interior of the body; during rear loading, these side doors 12'–19' would normally be in their "down" position. FIG. 3 also shows three carts 23, three rows of which will fit in the completely open interior 48 of the body 10 when arranged for rear unloading.

Figure 5:
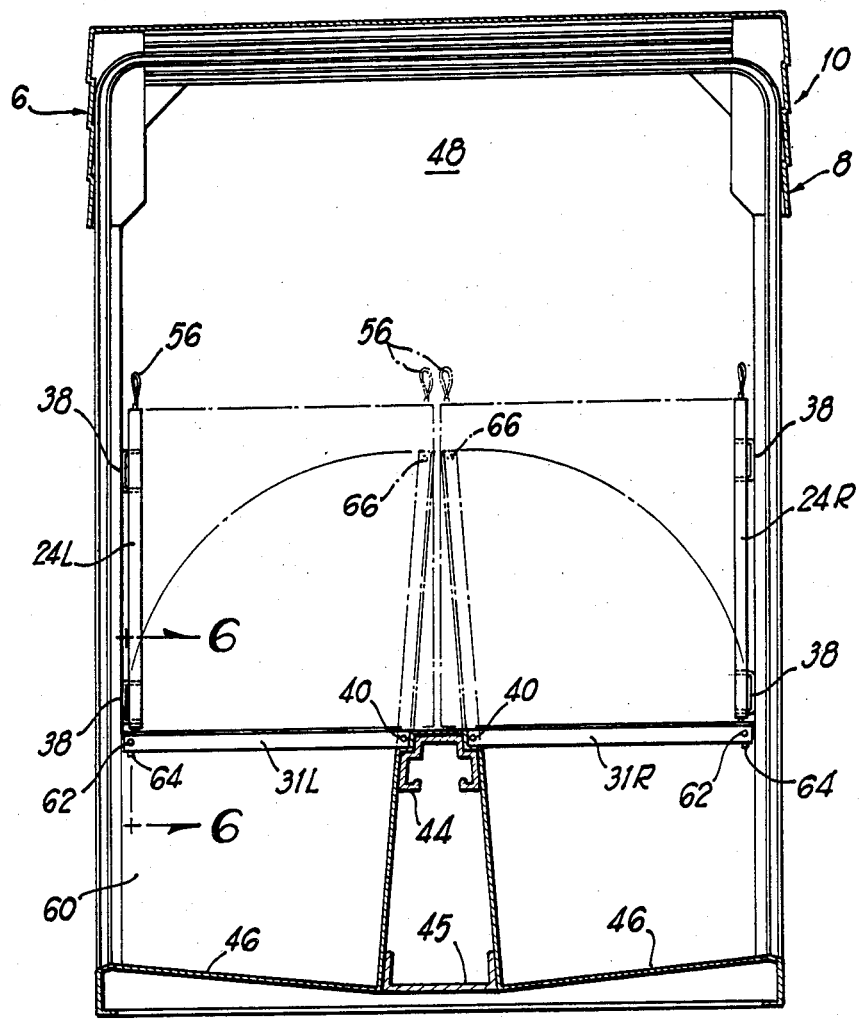
FIG. 5 is a vertical cross-sectional view through the body of FIG. 1 taken along line 5—5 of FIG. 4, with the body arranged for rear loading (but with the interior partitions shown in phantom lines in their positions for side loading)
Figure 6:
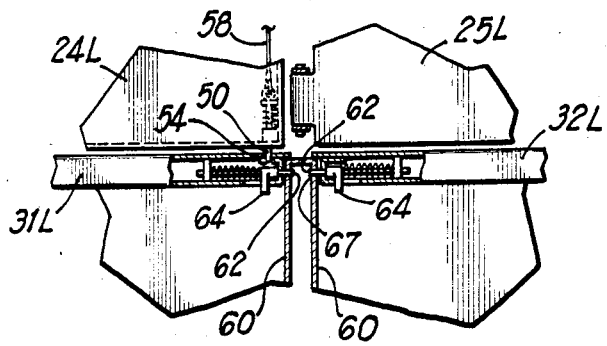
FIG. 6 is an enlarged, partial cross-sectional view taken along line 6—6 of FIG. 5.
Figure 7:
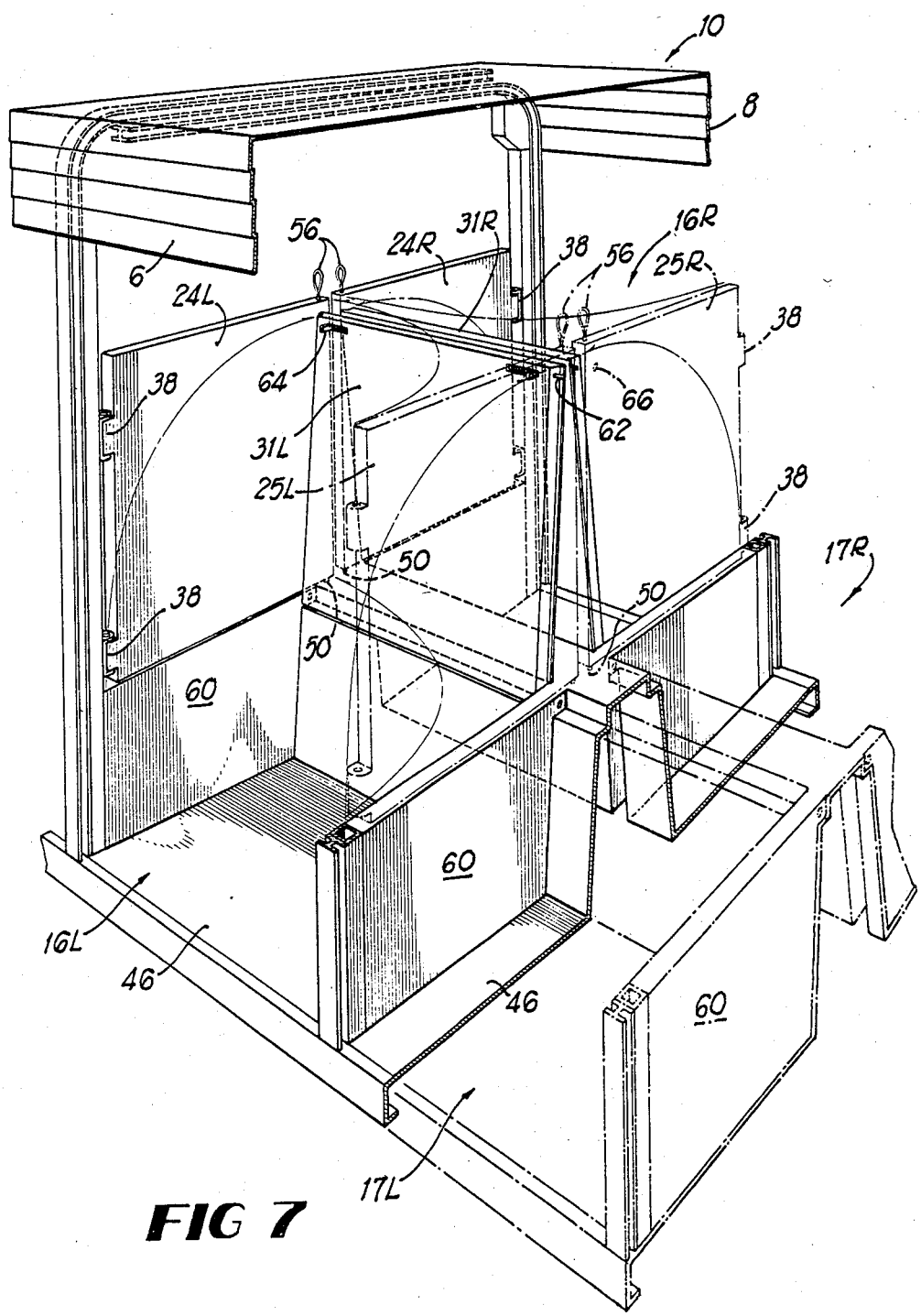
FIG. 7 is an enlarged, partial, perspective view showing the pivotable bulkhead and the folding floor in their positions for side loading.

As best shown in FIGS. 2, 5 and 7, the body 10 includes a plurality of transverse, hinged bulkheads 24L-27L and 24R-27R that form the interior sidewalls of each bay, and a plurality of hinged, substantially vertical, bay back panels 30L-33L and 30R-33R each of which forms a back wall for one bay. When the body 10 is arranged as shown in FIG. 2 (and in phantom lines in FIG. 5), the bulkheads 24L-27L and 24R-27R separate the interior of the body into the individual bays 12-19, and the bay back panels 30-33 form back walls for each of the bays. The body 10 can be used in this configuration in the same way as the present well-known side loading trucks or trailers are used. Some of the bays have two hinged bulkheads one forming each sidewall thereof, while others have a permanent wall for both sidewalls, namely bays 12, 13, and 14, and others have one hinged bulkhead and one other wall, namely bays 15 and 19. The term "interior bulkhead" does not include the rear door 22.

According to the present invention, the interior partitions (the bulkheads and the bay back panels) are each hingedly connected so they can be moved to a different position to convert the body 10 to a rear loading vehicle having a completely open interior and a flat floor at dock height. The manner in which the interior panels are hinged and the way they move will now be described.

Figure 8:
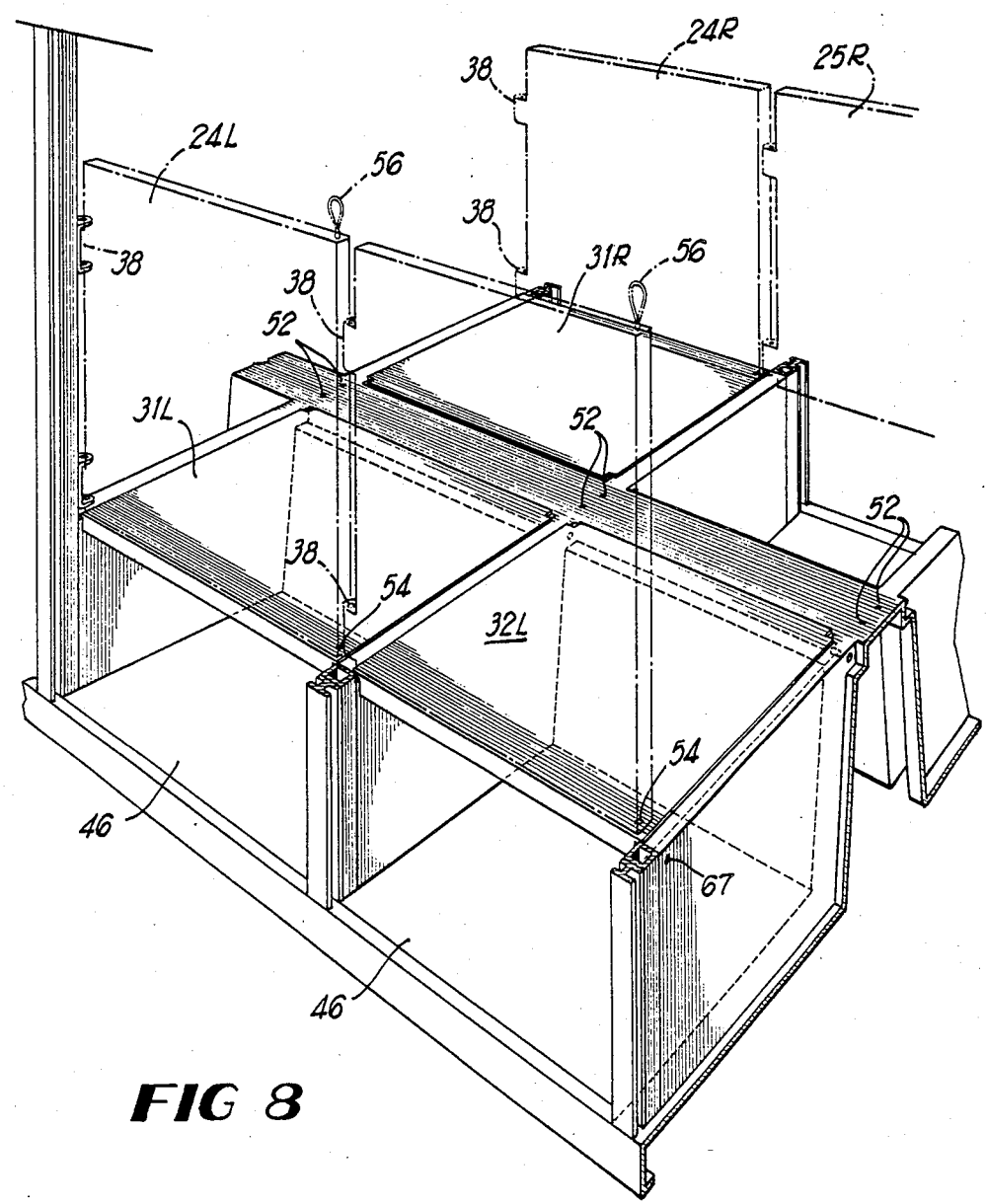
FIG. 8 is an enlarged, partial, perspective view similar to FIG. 7 but showing the movable interior partitions in their positions for rear loading.

The bulkheads 24L-27L and 24R-27R are each hingedly connected along a vertical axis by two hinges 38 so they can swing out toward and parallel to the adjacent sidewall of the body, as best shown in FIGS. 3, 5 and 8. The bay back panels are hingedly connected along a horizontal axis by two hinges 40 so they can swing (or fold) down to a horizontal position to form or provide a new, level floor at the same level as that of the floor 42 of the wheel housing bay 19. The body 10 also includes an upper longitudinal support beam 44 and a lower longitudinal support beam 45, that are located completely beneath the floor 42 of bay 19. In this way, the body 10 can be converted from a side loading vehicle with individual bays with downwardly sloping floors 46, to a rear loading vehicle with a completely open interior 48 with a flat floor.

The bulkheads are provided with a spring biased, retractable pin 50 on the bottom outside edge thereof for locking the bulkheads in a first recess 52 in the side loading arrangement and in a second recess 54 in the rear loading arrangement. A handle 56 located on the top of the bulkhead adjacent its outside edge, is connected to the pin 50 by a cable 58 for retracting the pin preparatory to moving the bulkhead from one position to the other. The recess 52 is in a stationary bay divider wall 60, and the recess 54 is in a top surface of each of the bay back panels 30-33 when in their "down" position. A recess 68 is provided in the wheel housing bay for each of the pins 50 in the last pair of bulkheads.

The bay back panels 30-33 each have a pair of spring loaded pins 62 in opposite side edges thereof adjacent the distal end thereof. These pins 62 can be manually retracted by a handle 64. The pins 62 each fit into a recess 66 in the adjacent bulkhead when the panels 30-33 are in their "up" position to stabilize the bay partitions. Similarly, the pins 62 fit into a recess 67 in the adjacent, stationary, lower, bay divider wall 60, when the panels 30-33 are in their "down" position to help stabilize the floor.

In the preferred embodiment shown in the drawings, the bays 12, 13 and 14 are not convertible. The wall between the bays 14 and 15 is thus permanent. Because this wall can not swing out against the roll-up side doors 15', a pair or bars 70L and 72L on the left side of the body 10, and a pair of bars 70R and 72R on the right side of the body, are hingedly connected to pivot out against the sidewall of the body to protect the fold up doors 15, when the body is converted for rear loading.

FIG. 3 shows three rows of carts 74 being loaded into the interior of the body 10. When using carts, they are preferably stabilized by pinning to the inside of the body 10 as is well-known. Alternatively, bulk delivery can be accommodated by pallet loads moved out the rear of the vehicle by pallet jack. In this case the bulk pallets would be loaded from the side of the vehicle by forklift. To do so, the bulkheads 24L-27L and 24R-27R and bars 70L, 72L, 70R and 72R would be in their respective positions as shown in FIG. 2. The bay back panels 30-33 would be in their respective positions as shown in FIG. 3. In removing the bulk pallets out the rear of the trailer, the bulkheads 24L-27L and 24R-27R would be moved back against the inside of the side doors of the vehicle one at a time as pallets are removed. The bulkheads therefore provide load stability during transit.

While the preferred embodiment of this invention has been described above in detail, it is to be understood that variations and modifications can be made therein without departing from the spirit and scope of the present invention as set forth in the appended claims. For example, this invention can be used in various beverage bodies such as trucks or trailers. The vehicle can have any desired number of bays, and any desired numbers of the bays can be convertible for rear loading. Other means can be used for making the interior panels or partitions movable and for stabilizing them. For example, it is not essential that the partitions be hinged for movement. Other shapes and sizes can be used for the partitions. While the rear door is shown as a roll-up door, other types can be used. Other numbers and types of pins and mating recesses can be used.

What is claimed is:

1. A method for converting a beverage body for a delivery vehicle from side loading to rear loading comprising the steps of:
   (a) providing a beverage body having a pair of parallel sidewalls, a rear wall, a plurality of left and right bays, a separate roll-up side door in said sidewalls for providing access into each one of said bays, a pair of transverse bulkheads forming the interior sidewalls of each of said bays, and a substantially vertical bay back panel forming the back wall of each bay;
   (b) providing said body with a rear door in said rear wall for rear loading;
   (c) providing said body with a wheel housing bay having a wheel housing bay floor;
   (d) providing said body with a longitudinal support beam extending the length of said body, and locating said beam completely beneath said wheel housing bay floor;
   (e) moving said bulkheads for selected ones of said bays from their transverse positions, to a position adjacent to and substantially parallel to one of said sidewalls; and
   (f) moving said bay back panels for said selected ones of said bays, down to form a floor level with said wheel housing bay floor to provide a completely open body interior having a flat floor in the area of said selected bays.

2. The method as recited in claim 1 wherein said bulkhead moving step comprises hingedly connecting said bulkheads along a vertical axis adjacent to a sidewall of said body, and swinging said bulkheads out parallel to said sidewalls.

3. The method as recited in claim 1 wherein said bay back panel moving step comprises hingedly connecting said panels along a horizontal axis and along an edge thereof parallel to said body sidewalls and adjacent to the longitudinal center of said body, and swinging said panels down to a horizonal position level with said wheel housing bay floor.

4. The method as recited in claim 3 wherein said bulkhead moving step comprises hingedly connecting said bulkheads along a vertical axis adjacent to a sidewall of said body, and swinging said bulkheads out parallel to said sidewalls.

5. The method as recited in claim 4 including pinning said bulkheads to said body and pinning said panels to said bulkheads when said panels are in their vertical position and said bulkheads are in their transverse position.

6. The method as recited in claim 4 including pinning said bulkheads to said panels when said bulkheads are in their position parallel to the sidewalls of said body, and said panels are in their horizontal position.

7. The method as recited in claim 6 including pinning said bulkheads to said body and pinning said panels to said bulkheads when said panels are in their vertical position and said bulkheads are in their transverse position.

8. A convertible beverage body for a delivery vehicle comprising:
(a) a beverage body having a pair of parallel sidewalls, a rear wall, a plurality of left and right bays, a separate roll-up side door in said sidewall for providing access into each one of said bays, a transverse bulkhead for forming each interior sidewall of each bay, and a substantially vertical bay back panel forming the back wall of a majority of said bays, a rear door providing access into said body through said rear wall, and a wheel housing with a wheel housing bay thereabove and having a wheel housing bay floor;
(b) a longitudinal support beam extending the length of said body along the center thereof, said beam being located entirely beneath the level of said wheel housing bay floor;
(c) means for moving selected ones of said bulkheads for said bays from their transverse position, to a position adjacent to and substantially parallel to one of said sidewalls; and
(d) means for moving selected ones of said bay back panels down to a horizontal position level with said wheel housing bay floor.

9. The article as recited in claim 8 wherein said bulkhead moving means includes means for hingedly connecting each of said selected bulkheads along a vertical axis adjacent to a sidewall of said body, such that each of said selected bulkheads can swing from said transverse position to a position adjacent to and parallel to one of said body sidewalls.

10. The article as recited in claim 8 wherein said panel moving means includes means for hingedly connecting each of said panels along a horizontal axis and along an edge thereof parallel to said body sidewalls and adjacent to the longitudinal center of said body, such that said panels can swing down from said vertical position to a horizontal position level with said wheel housing bay floor.

11. The article as recited in claim 10 wherein said bulkhead moving means includes means for hingedly connecting each of said selected bulkheads along a vertical axis adjacent to a sidewall of said body, such that each of said selected bulkheads can swing from said transverse position to a position adjacent to and parallel to one of said body sidewalls.

12. The article as recited in claim 11 including means for pinning said panels to said bulkheads when said panels are in their vertical position and said bulkheads are in their transverse position, and means for pinning said bulkheads to said body when said bulkheads are in their vertical position.

13. The article as recited in claim 11 including means for pinning said bulkheads to said panels when said bulkheads are in their position parallel to the body sidewalls, and said panels are in their horizontal position.

14. The article as recited in claim 13 including means for pinning said panels to said bulkheads when said panels are in their vertical position and said bulkheads are in their transverse position, and means for pinning said bulkheads to said body when said bulkheads are in their vertical position.

* * * * *